US011278079B2

(12) United States Patent
Keffler

(10) Patent No.: US 11,278,079 B2
(45) Date of Patent: Mar. 22, 2022

(54) ADJUSTABLE AND DUAL-SUSPENSION BOOT LEVERS

(71) Applicant: John William Keffler, Evergreen, CO (US)

(72) Inventor: John William Keffler, Evergreen, CO (US)

(73) Assignee: Phantom Snow Industries LLC, Evergreen, CO (US)

( * ) Notice: Subject to any disclaimer, the term of this patent is extended or adjusted under 35 U.S.C. 154(b) by 278 days.

(21) Appl. No.: 16/241,319

(22) Filed: Jan. 7, 2019

(65) Prior Publication Data

US 2019/0216164 A1 Jul. 18, 2019

Related U.S. Application Data

(60) Provisional application No. 62/617,678, filed on Jan. 16, 2018.

(51) Int. Cl.
*A43B 5/04* (2006.01)
*A43C 11/14* (2006.01)
*A43C 11/16* (2006.01)

(52) U.S. Cl.
CPC .......... *A43B 5/0474* (2013.01); *A43C 11/142* (2013.01); *A43C 11/16* (2013.01)

(58) Field of Classification Search
CPC ...... A43B 5/0474; A43C 11/142; A43C 11/16
USPC .............................................. 36/118.2, 118.7
See application file for complete search history.

(56) References Cited

U.S. PATENT DOCUMENTS

| 3,747,235 A | * | 7/1973 | Post | A43B 5/0454 |
| | | | | 36/117.1 |
| 4,152,849 A | * | 5/1979 | Frechin | A43B 5/0466 |
| | | | | 36/1.5 |
| 4,349,971 A | * | 9/1982 | Everest, III | A43B 5/0474 |
| | | | | 36/118.7 |
| 4,519,150 A | * | 5/1985 | Arieh | A43B 5/0452 |
| | | | | 24/71 SK |

(Continued)

FOREIGN PATENT DOCUMENTS

| FR | 3050619 A1 | 11/2017 | | |
| JP | 02114901 A | * 4/1990 | ........... | A43B 5/0452 |
| JP | 05184403 A | * 7/1993 | ........... | A43B 5/0474 |

OTHER PUBLICATIONS

Screen capture of Atomic Backland boot from shop.atomic.com/en-us/products/backland-ultimate-ae0001206.html, accessed Apr. 25, 2019.

(Continued)

*Primary Examiner* — Jocelyn Bravo
(74) *Attorney, Agent, or Firm* — Elevated IP, LLC

(57) ABSTRACT

Adjustable and/or dual-suspension boot levers for hardshell boots, having upper parts and lower parts that rotate relative to one another, are disclosed. Adjustable boot levers disclosed herein are adjustable along a continuum or at one of a plurality of preset positions on a lever to provide a forward-lean angle customizable to a user's preferences. Dual-suspension boot levers provide fore-aft dampening and are also customizable by selection of appropriate elastic materials and properties for use in the forward-lean and backward-lean suspension devices. In some embodiments, adjustability and dual-suspension are combined in a boot lever design.

11 Claims, 12 Drawing Sheets

(56) References Cited

U.S. PATENT DOCUMENTS

| | | | | |
|---|---|---|---|---|
| 4,631,839 A * | 12/1986 | Bonetti | A43C 11/16 | 24/68 SK |
| 4,691,454 A * | 9/1987 | Ottieri | A43B 1/0018 | 24/68 SK |
| 4,761,899 A * | 8/1988 | Marxer | A43B 5/0456 | 36/118.7 |
| 4,765,069 A * | 8/1988 | Baggio | A43C 11/00 | 36/118.9 |
| 4,821,433 A * | 4/1989 | Marxer | A43C 11/00 | 36/118.7 |
| 4,839,973 A * | 6/1989 | Dodge | A43B 5/0478 | 36/118.7 |
| 4,852,222 A * | 8/1989 | Courvoisier | A43B 5/0447 | 24/68 SK |
| 4,888,889 A * | 12/1989 | Sartor | A43B 5/0429 | 36/118.7 |
| 4,899,469 A * | 2/1990 | Hilgarth | A43B 5/0452 | 36/118.8 |
| 4,916,835 A * | 4/1990 | Begey | A43B 5/0466 | 36/114 |
| 4,932,143 A * | 6/1990 | Benetti | A43B 5/0456 | 36/118.4 |
| 5,031,340 A * | 7/1991 | Hilgarth | A43B 5/0427 | 36/117.1 |
| 5,068,984 A * | 12/1991 | Kaufman | A43B 5/047 | 36/117.4 |
| 5,083,348 A * | 1/1992 | Gorza | A43B 5/0415 | 24/68 SK |
| 5,086,573 A * | 2/1992 | Mabboux | A43B 7/02 | 36/117.1 |
| 5,101,581 A * | 4/1992 | Hilgarth | A43B 5/0456 | 36/118.4 |
| 5,107,608 A * | 4/1992 | Kreitenberg | A43B 1/0054 | 24/68 SK |
| 5,136,794 A * | 8/1992 | Stampacchia | A43B 5/0474 | 36/118.7 |
| 5,283,964 A * | 2/1994 | Chemello | A43B 5/0474 | 36/118.7 |
| 5,387,246 A * | 2/1995 | Phillips | A61F 2/602 | 623/56 |
| 5,426,871 A * | 6/1995 | Spademan | A43B 5/0441 | 36/118.2 |
| 5,560,128 A * | 10/1996 | Marega | A43B 5/0474 | 36/118.2 |
| 5,784,810 A * | 7/1998 | Bonaventure | A43B 5/0456 | 36/118.2 |
| 6,012,237 A * | 1/2000 | Okajima | A43B 5/0401 | 36/118.2 |
| 6,101,745 A * | 8/2000 | Grandin | A43C 11/1413 | 36/118.2 |
| 6,131,313 A * | 10/2000 | Pierce | A43B 5/0474 | 36/118.3 |
| 6,231,066 B1 * | 5/2001 | Okajima | A63C 10/24 | 280/14.21 |
| 6,263,593 B1 * | 7/2001 | Pierce | A43B 5/0456 | 36/118.3 |
| 6,325,405 B2 * | 12/2001 | Okajima | A63C 10/24 | 280/611 |
| 6,398,246 B1 * | 6/2002 | Okajima | A63C 10/24 | 280/263 |
| 6,643,955 B2 * | 11/2003 | Pierce | A43B 5/0456 | 36/118.3 |
| 7,231,729 B2 * | 6/2007 | Heierling | A43B 5/04 | 36/117.3 |
| 8,132,343 B2 * | 3/2012 | Bollard | A43B 5/0474 | 36/118.7 |
| 9,380,826 B2 * | 7/2016 | Viniero | A43B 5/0466 | |
| 10,398,191 B2 * | 9/2019 | Cox | A43B 5/0486 | |
| 10,485,290 B2 * | 11/2019 | Parisotto | A43B 5/0405 | |
| 2001/0002518 A1 * | 6/2001 | Morrow | A43B 5/0403 | 36/118.8 |
| 2001/0009323 A1 * | 7/2001 | Okajima | A63C 10/24 | 280/623 |
| 2001/0009324 A1 * | 7/2001 | Okajima | A63C 10/24 | 280/623 |
| 2002/0029497 A1 * | 3/2002 | Pierce | A43B 5/0456 | 36/118.3 |
| 2002/0095822 A1 * | 7/2002 | Challande | A43B 5/0474 | 36/118.7 |
| 2006/0005430 A1 * | 1/2006 | Valat | A43B 5/0466 | 36/117.5 |
| 2006/0156517 A1 * | 7/2006 | Hammerslag | A43C 1/04 | 24/68 SK |
| 2009/0320327 A1 * | 12/2009 | Perkins | A43B 5/0445 | 36/118.7 |
| 2010/0229425 A1 * | 9/2010 | Parisotto | A43B 5/0474 | 36/117.1 |
| 2013/0097892 A1 * | 4/2013 | Viniero | A43B 5/047 | 36/117.1 |
| 2014/0013629 A1 * | 1/2014 | Haugen | A43B 5/0496 | 36/117.1 |
| 2015/0033586 A1 * | 2/2015 | Parisotto | A43B 5/0496 | 36/117.1 |
| 2016/0324252 A1 * | 11/2016 | Viniero | A43B 5/0496 | |
| 2016/0345658 A1 * | 12/2016 | Grandin | A43B 5/0474 | |
| 2018/0070672 A1 * | 3/2018 | Parisotto | A43B 5/0456 | |
| 2018/0368508 A1 * | 12/2018 | Gorza | A43B 5/0496 | |

OTHER PUBLICATIONS

Screen capture of Black Snowboard boot from pierregignoux.fr/en/produit/black-snowboard/, accessed Apr. 19, 2019.

Screen capture of BTS Kit from bomberonline.3dcartstores.com/BTS-Kit_p_106.html, accessed Apr. 19, 2019.

Screen capture of Fischer Carbon Travers from fischersports.com/us_en/travers-carbon-677?c=158, accessed Apr. 19, 2019.

Screen capture of La Sportive Stratos Hi-Cube from lasportiva.com/en/stratos-hi-cube, accessed Apr. 19, 2019.

Screen capture of Scarpa Alien from scarpa.net/en/alien-1.html, accessed Apr. 19, 2019.

* cited by examiner

ADJUSTABLE AND DUAL-SUSPENSION BOOT LEVERS

CROSS-REFERENCE TO RELATED APPLICATIONS

This application claims the benefit of and priority to U.S. Provisional Patent Application No. 62/617,678, filed Jan. 16, 2018, which is hereby incorporated by reference in its entirety.

BACKGROUND

Users of modern hardshell ski and snowboard boots enjoy the freedom-of-movement afforded by boots capable of transitioning between a walk mode and a downhill mode. In the walk mode, the upper part of the boot is allowed to rotate relative to the lower part of the boot, typically around pivots positioned at the inner and outer ankle areas. The walk mode allows for a more natural gait than a fixed-position boot, which is useful for walking around the base area of a ski resort and for uphill travel by backcountry skiers and riders. However, the free rotation of the boot parts must be constrained during downhill travel for effective power transfer from the user's leg to the boot and ski or snowboard.

The downhill mode of most commercially available boots is achieved by locking the upper part of the boot at a manufacturer-specified forward-lean angle relative to the lower part of the boot. In some more advanced boot designs, two manufacturer-specified forward-lean angles (e.g., regular lean and aggressive lean) are available. However, no known transition mechanisms currently provide the option to customize the forward-lean angle to a user's preference or to adjust the forward-lean angle along a continuum or at one of a plurality of preset positions on a lever as user preferences, snow conditions, boot fatigue and/or other factors change.

In addition, hardshell boots locked in downhill mode are sometimes too responsive for snowboarders, who are accustomed to soft boots that allow for some knee bending that does not result in turn initiation. Snowboarders seeking a less responsive boot can install an after-market boot tuning system (BTS) that provides spring-loaded dampening in the fore and aft directions, but installation of the BTS replaces the transition mechanism, thereby eliminating the option to use the boot in walk mode. French Patent Application No. 3050619 also attempts to allow some knee bending with a hardshell boot by providing a transition lever capable of dampening forward movement when the lever is in the downhill position, but the transition lever has a hard stop at the rebound position, which can interrupt a rider's natural movement. Thus, known systems for making hardshell boots less responsive tend to decrease a boot's functionality and/or inhibit a rider's natural movement.

SUMMARY

The present invention includes a lever for transitioning a boot, such as a ski boot, snowboard boot, ice climbing boot or other boot, between an open (walk mode) position, which allows an upper part of the boot to freely rotate relative to a lower part of the boot, and a locked or closed (ski/ride/ downhill mode) position, which impedes or substantially prevents rotation of the upper part relative to the lower part.

In some embodiments, boot levers disclosed herein control a boot's range of motion, stiffness, dampening and/or support. For example, a boot's range of motion is at least partially determined by whether the lever is in an open or closed position. Also, the amount of forward travel allowed by the lever, while in the closed position, (aka, the forward support range) is adjustable in some embodiments when the connector rod length is changed (e.g., by threading the connector rod into or out of a lever body). The stiffness and rebound characteristics (e.g., spring rate) of the suspension devices are determined, at least in part, by the type, amount, and form factor of the elastic materials used in the suspension devices. The elastic materials of the forward-lean suspension device and backward-lean suspension device may be independently selected, removed and/or replaced. In some embodiments, the stiffness and/or rebound characteristics of the forward-lean suspension device, the backward-lean suspension device or both can be adjusted without removing and/or replacing any component of the device. For example, air or hydraulic fluid may be added to or removed from one or more of the suspension devices or a chamber of a suspension device.

In an aspect, a lever for a hardshell boot, such as a ski or snowboard boot, comprises means for setting a closed-position forward-lean angle along a continuum or at one of a plurality of preset positions.

In an aspect, an adjustable lever comprises a lever body hingedly mounted to a lever bracket, the lever body comprising at least a portion of a connector rod, and a connector head disposed on the connector rod and translatable along a length of the connector rod. In some embodiments, adjusting a length between a lever pivot axle and a connector head adjusts a forward-lean angle of a boot to a user's customized setting.

In an aspect, an adjustable lever comprises a lever body hingedly mounted to a lever bracket, the lever body comprising a threaded opening for receiving at least a portion of a threaded connector rod, the connector rod having a connector head disposed thereon.

In an embodiment, a dual-suspension lever on a boot, such as a ski or snowboard boot, provides fore-aft dampening when the lever is in the closed position. In some embodiments, a dual-suspension lever is configured to provide a fixed, non-adjustable forward-lean angle when the lever is in the closed position and no external pressure is applied to the boot. For example, in some embodiments, a dual-suspension boot lever comprises a connector head formed as a unitary body with a connector rod fixedly attached to a lever body.

In an aspect, a dual-suspension, hinged lever for a ski or snowboard boot comprises a forward-lean suspension device and a backward-lean suspension device.

In an aspect, a dual-suspension lever comprises: a lever body hingedly mounted to a lever bracket, the lever body comprising a forward-lean suspension device and at least a portion of a connector rod; a backward-lean suspension device disposed at an end of the forward-lean suspension device; and a connector head disposed on the connector rod.

In an aspect, an adjustable, dual-suspension lever for a ski or snowboard boot comprises means for setting a closed-position forward-lean angle along a continuum or at one of a plurality of preset positions, a forward-dean suspension device and a backward-lean suspension device.

In an aspect, an adjustable, dual-suspension lever comprises: a lever body hingedly mounted to a lever bracket, the lever body comprising a forward-lean suspension device and at least a portion of a connector rod; a backward-lean suspension device disposed at an end of the forward-lean suspension device; and a connector head disposed on the connector rod and translatable along a length of the connector rod.

In an embodiment, a dual-suspension lever further comprises a second backward-lean suspension device at an opposite end of the forward-lean suspension device.

In an embodiment, a backward-lean suspension device is disposed within a lever body or outside a lever body.

In an embodiment, a dual-suspension lever further comprises a travel plate disposed between a forward-lean suspension device and a backward-lean suspension device.

In an aspect, a boot comprises: a lower part for receiving at least a portion of a user's foot; an upper part for receiving at least a portion of the user's leg, wherein the upper part and the lower part are connected to one another by at least two pivot points defining an axis of rotation; and a lever that is adjustable between an open position that does not restrict rotation and a closed position that restricts rotation; wherein the lever comprises means for adjusting a forward-lean angle of the closed position along a continuum or at one of a plurality of preset positions.

In an aspect, a boot comprises: a lower part for receiving at least a portion of a user's foot; an upper part for receiving at least a portion of the user's leg, wherein the upper part and the lower part are connected to one another by at least two pivot points; and a lever that is adjustable between an open position that does not restrict rotation and a closed position that restricts rotation; wherein the lever is a dual-suspension lever comprising both a forward-lean suspension device and a backward-lean suspension device.

In an aspect, a boot comprises: a lower part for receiving at least a portion of a user's foot; an upper part for receiving at least a portion of the user's leg, wherein the upper part and the lower part are connected to one another by at least two pivot points; and a lever that is adjustable between an open position that does not restrict rotation and a closed position that restricts rotation; wherein the lever is an adjustable, dual-suspension lever comprising means for adjusting a forward-lean angle of the closed position, a forward-lean suspension device, and a backward-lean suspension device.

In an embodiment, a lever comprises means for adjusting the forward-lean angle of the closed position.

In an embodiment, a forward-lean angle is adjustable along a continuum or at one of a plurality of preset positions on a lever. For example, an unthreaded connector head may be locked in the proper position to mate with a connector head interface device at any position along a threaded connector rod by a pair of jam nuts. In an embodiment, a plurality of preset positions on the lever may comprise a series of holes through a connector rod configured to receive a pin of a connector head, a series of holes through a connector rod configured to receive a pin of a lever body, a series of indentations along a connector rod configured to mate with a protrusion of a connector head, a series of indentations along a connector rod configured to mate with a protrusion of a connector head, a series of one-way mechanical stops (e.g., protrusions that are substantially collapsible in one direction and substantially rigid in the opposite direction) disposed along a connector rod, and combinations thereof.

In an embodiment, means for adjusting the forward-lean angle are selected from the group consisting of a translatable connector head, a translatable connector rod, jam nuts, set screws, a series of holes through a connector rod configured to receive a pin of a connector head, a series of holes through a connector rod configured to receive a pin of a lever body, a series of indentations along a connector rod configured to mate with a protrusion of a connector head, a series of indentations along a connector rod configured to mate with a protrusion of a connector head, a series of one-way mechanical stops disposed along a connector rod, and combinations thereof.

In an embodiment, a lever further comprises a forward-lean suspension device, a backward-lean suspension device or both.

In an embodiment, a dual-suspension lever comprises both a forward-lean suspension device and a backward-lean suspension device.

In an embodiment, a forward-lean suspension device and/or a backward-lean suspension device comprise(s) a spring, a bumper of elastic material, an air shock, a hydraulic shock, or combinations thereof. For example, an elastic material may be selected from the group consisting of rubber, foam, cork, polymer, and combinations thereof.

In an embodiment, a lever is on the heel-side of the boot.

In an embodiment, one or more components of the lever is made of a material selected from the group consisting of stainless steel, steel, plastic, carbon fiber, aluminum, titanium, magnesium, gold, silver, alloys comprising aluminum, titanium, magnesium, gold and/or silver and combinations of any of these materials.

In an embodiment, one or more components of the lever is fabricated by a method selected from the group consisting of 3D printing, casting, laser cutting, waterjet cutting, hand cutting and machining, computer numeric control (CNC) machining, injection molding, and combinations thereof.

In an embodiment, a lever further comprises one or more openings for receiving a cuff tensioning cable. For example, a cuff tensioning cable may connect a lever and an upper part of the boot. In an embodiment, moving a boot lever to an open position loosens the tension of the upper cuff strap, thereby increasing the volume of the upper part of the boot and reducing friction on a user's leg during walking.

In an embodiment, a lever body and a connector head are never in direct physical contact.

In an embodiment, a lever bracket comprises a slot for receiving a flat end of a connector rod.

In an embodiment, an upper part of a boot, a lower part of a boot or both the upper part and the lower part are made of a material selected from the group consisting of plastic, carbon fiber and combinations thereof.

In an aspect, a method of making a boot comprising any of the disclosed levers comprises retrofitting a boot by removing an existing lever from the boot and attaching an adjustable and/or dual-suspension lever to a lever bracket on the boot.

In an aspect, a method of making a boot comprising any of the disclosed levers comprises: mounting a lever bracket to a first part of a boot; connecting one of the levers disclosed herein to the lever bracket; and mounting a connector head interface device to a second part of the boot, wherein the connector head interface device is substantially aligned with a connector head of the lever when the lever is in the closed position.

In an aspect, a method for adjusting an adjustable lever comprises translating a connector head along a connector rod. For example, in an embodiment, the connector head may be threaded and moved by rotating the connector head around a threaded connector rod. In another embodiment, the connector head may be unthreaded. With either a threaded or unthreaded connector head, a pair of jam nuts disposed on either side of the connector head may secure the connector head in place. In another embodiment, one or more set screws within a connector head may be used to tighten the connector head at a desired location along the connector rod. In an embodiment, a series of holes through a connector rod may be configured to receive a pin of a connector head, a series of indentations along a connector rod may be configured to mate with a protrusion of a connector head, a series of one-way mechanical stops (e.g., protrusions that are substantially collapsible in one direction and substantially rigid in the opposite direction) may be disposed along a connector rod, and combinations thereof. Additional mechanisms for translating and securing the connector head along the connector rod are contemplated to be within the scope of the present disclosure.

In an aspect, a method for adjusting an adjustable lever comprises translating a connector rod. For example, a threaded connector rod may be screwed into or out of a threaded opening of a lever body to lengthen or shorten a distance between a lever pivot axle and a connector head interface device. In an embodiment, a series of holes through a connector rod may be configured to receive a pin of a lever body, a series of indentations along a connector rod may be configured to mate with a protrusion of a connector head, and combinations thereof.

In an aspect, a method for adjusting the suspension of a lever disclosed herein comprises one or more of (i) adding, removing or replacing a spring of the suspension device, (ii) adding or removing air from an air shock of the suspension device, (iii) adding or removing hydraulic fluid from a hydraulic shock of the suspension device, (iv) adding, removing or replacing an elastic material of the suspension device, and (v) shortening or elongating a travel distance of the lever (e.g., by adjusting the set position of a travel plate).

In an embodiment, the forward-lean suspension device, the backward-lean suspension device or both the forward-lean suspension device and the backward-lean suspension device may be locked out to substantially prevent the device(s) from providing suspension. For example, when a splitboarder chooses to use the halves of the splitboard as skis, he or she may wish to lock one or more of the suspension devices. In some embodiments, a suspension device may be locked or disabled by closing one or more valves of an air or hydraulic shock and/or by inserting a brace to physically prevent compression/extension of the suspension device.

In an aspect, a suspension lever for a hardshell boot comprises at least one of a forward-lean suspension device and a backward-lean suspension device and a biasing spring for maintaining the lever in an open or closed position.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

A "device" is a combination of components operably connected to produce one or more desired functions.

A "component" is used broadly to refer to an individual part of a device.

The terms "direct and indirect" describe the actions or physical positions of one component relative to another component, or one device relative to another device. For example, a component that "directly" acts upon or touches another component does so without intervention from an intermediary. Contrarily, a component that "indirectly" acts upon or touches another component does so through an intermediary (e.g., a third component).

As used herein, "continuum" refers to a continuous range that is not graduated into preset increments.

As used herein, a "forward-lean angle" of a boot is an angle formed by a line running substantially parallel to the front edge of an upper part of a boot and a line running substantially parallel to a top edge of a lower part of the boot when the boot is viewed in side profile. A forward-lean angle typically refers to the angle formed by the parallel lines of the upper and lower boot parts when the boot lever is in a closed position and no external pressure is applied to the boot.

Figure 1:
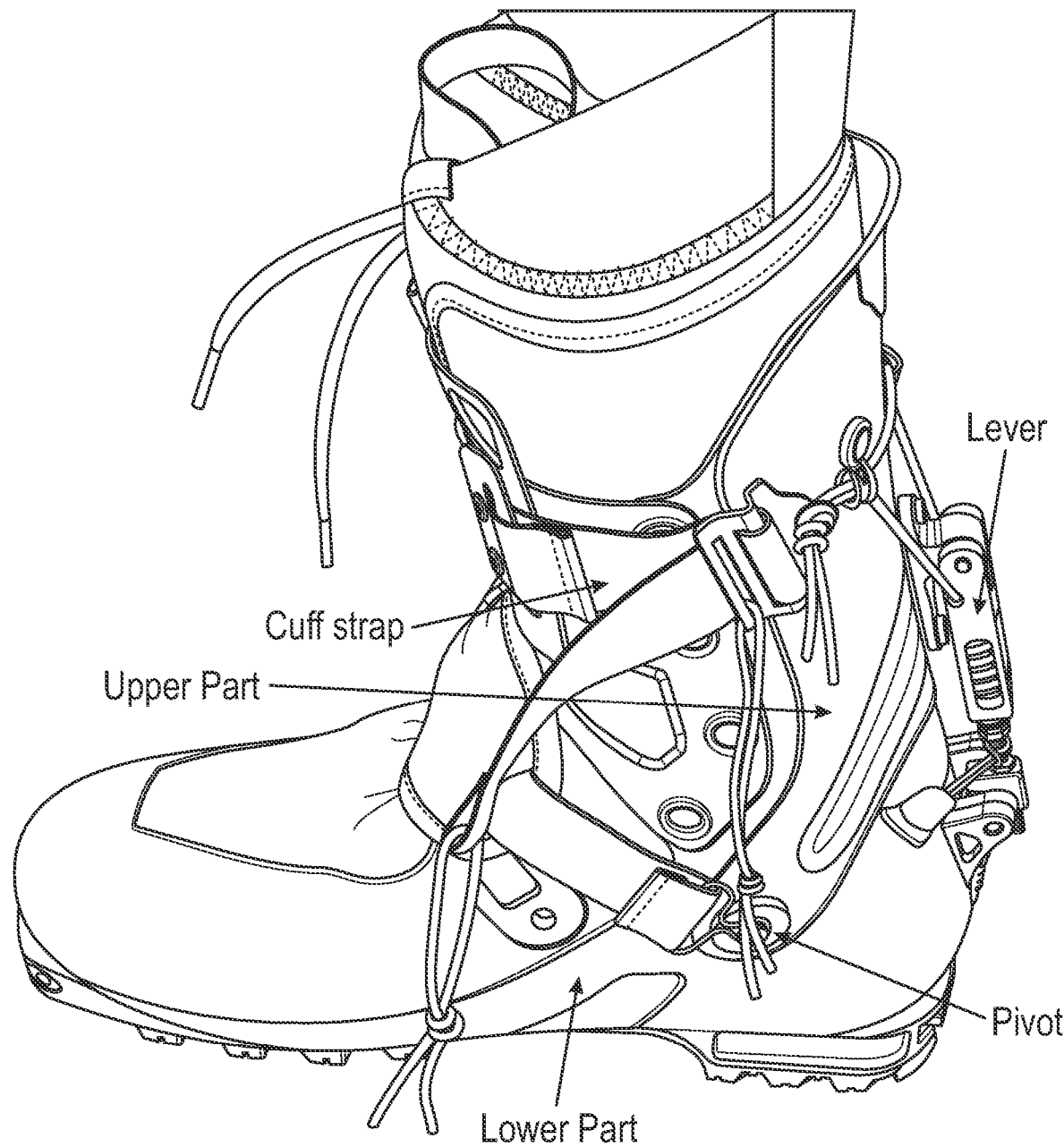
FIG. 1 is a picture of a boot comprising an upper part and a lower part connected by a pair of pivots and outfitted with an adjustable, dual suspension lever, according to an embodiment of the invention.
Figure 2:
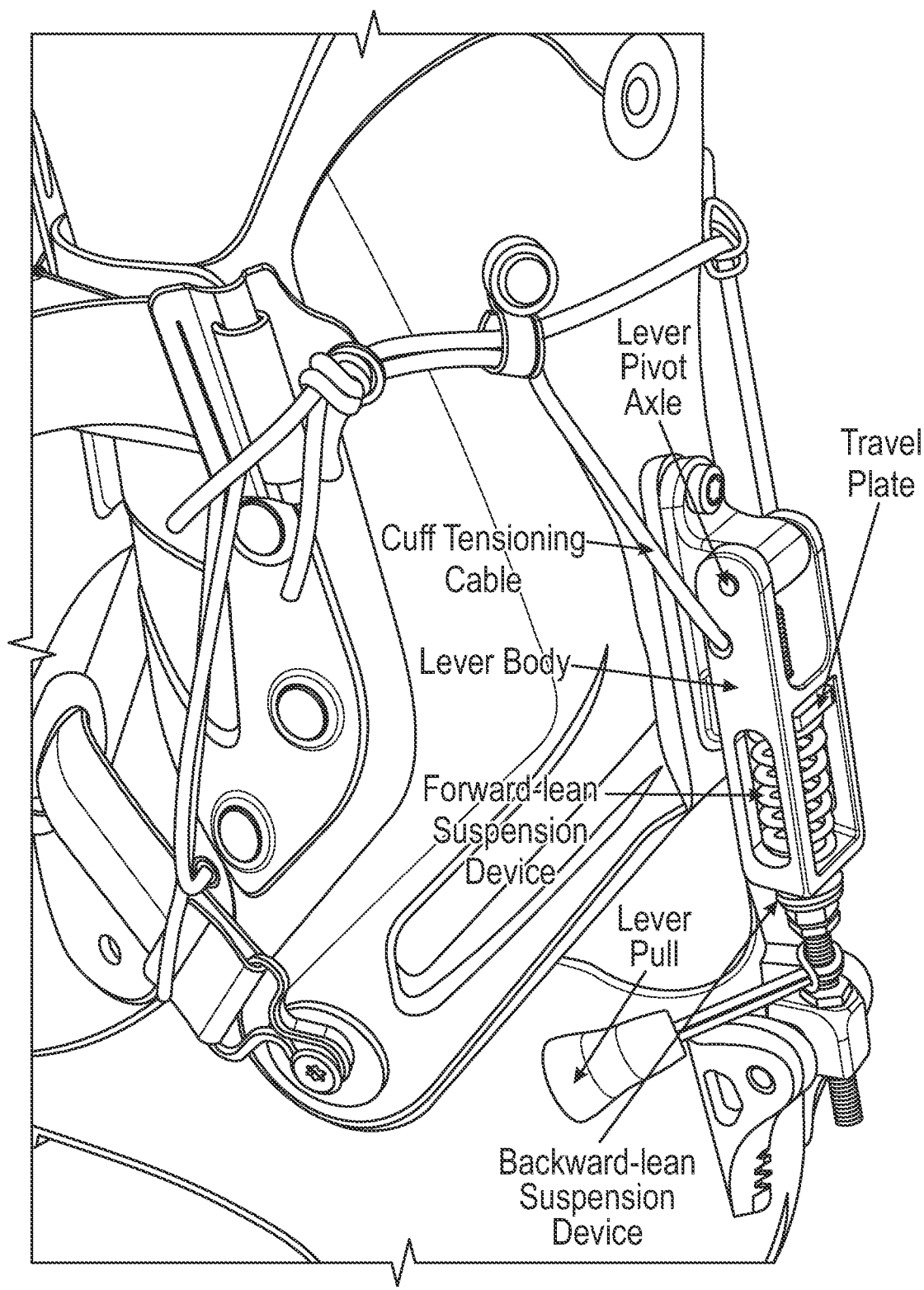
FIG. 2 is a picture of the adjustable, dual-suspension lever of FIG. 1 in the closed position.
Figure 3:
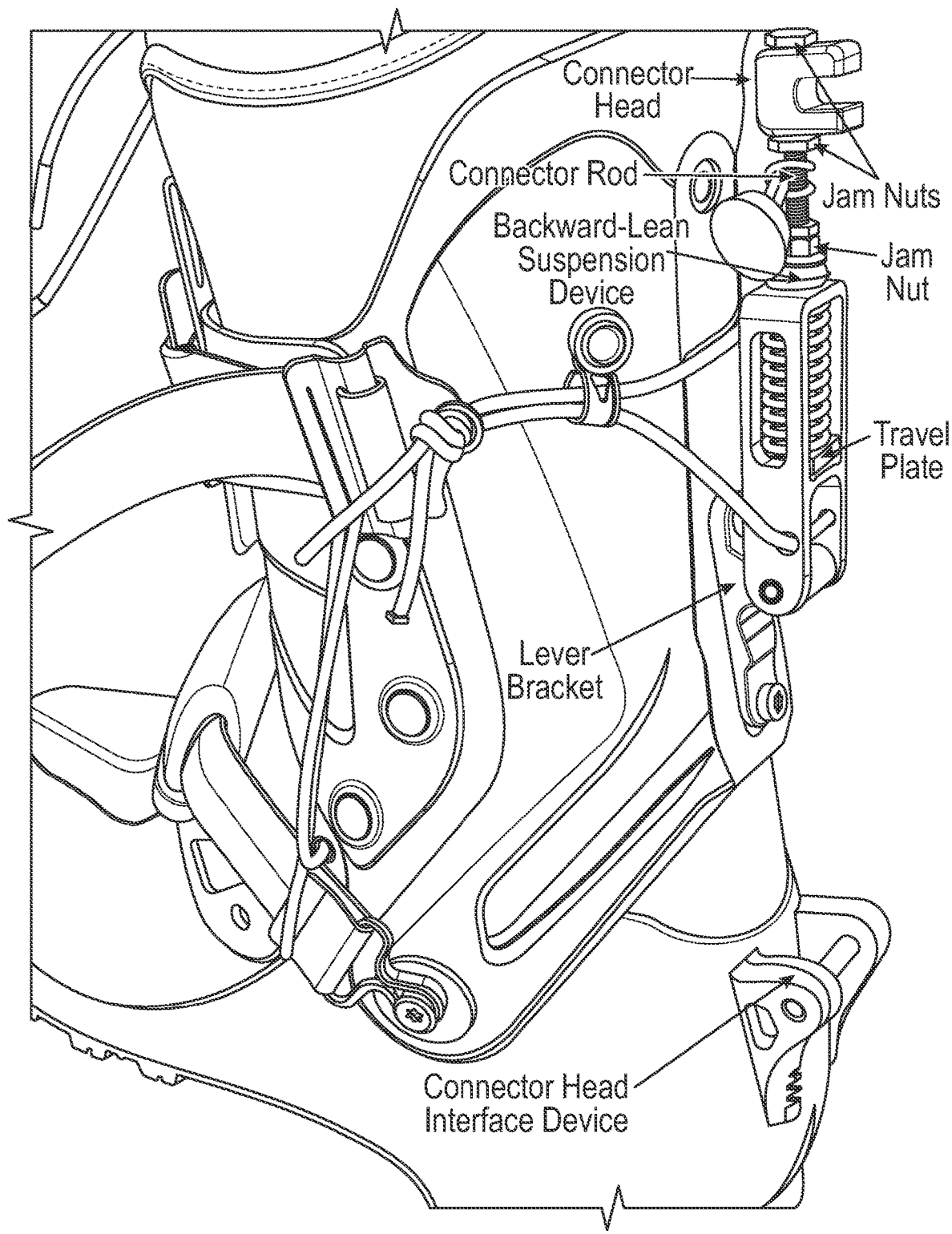
FIG. 3 is a picture of the adjustable, dual-suspension lever of FIG. 1 and FIG. 2 in the open position.
Figure 4:
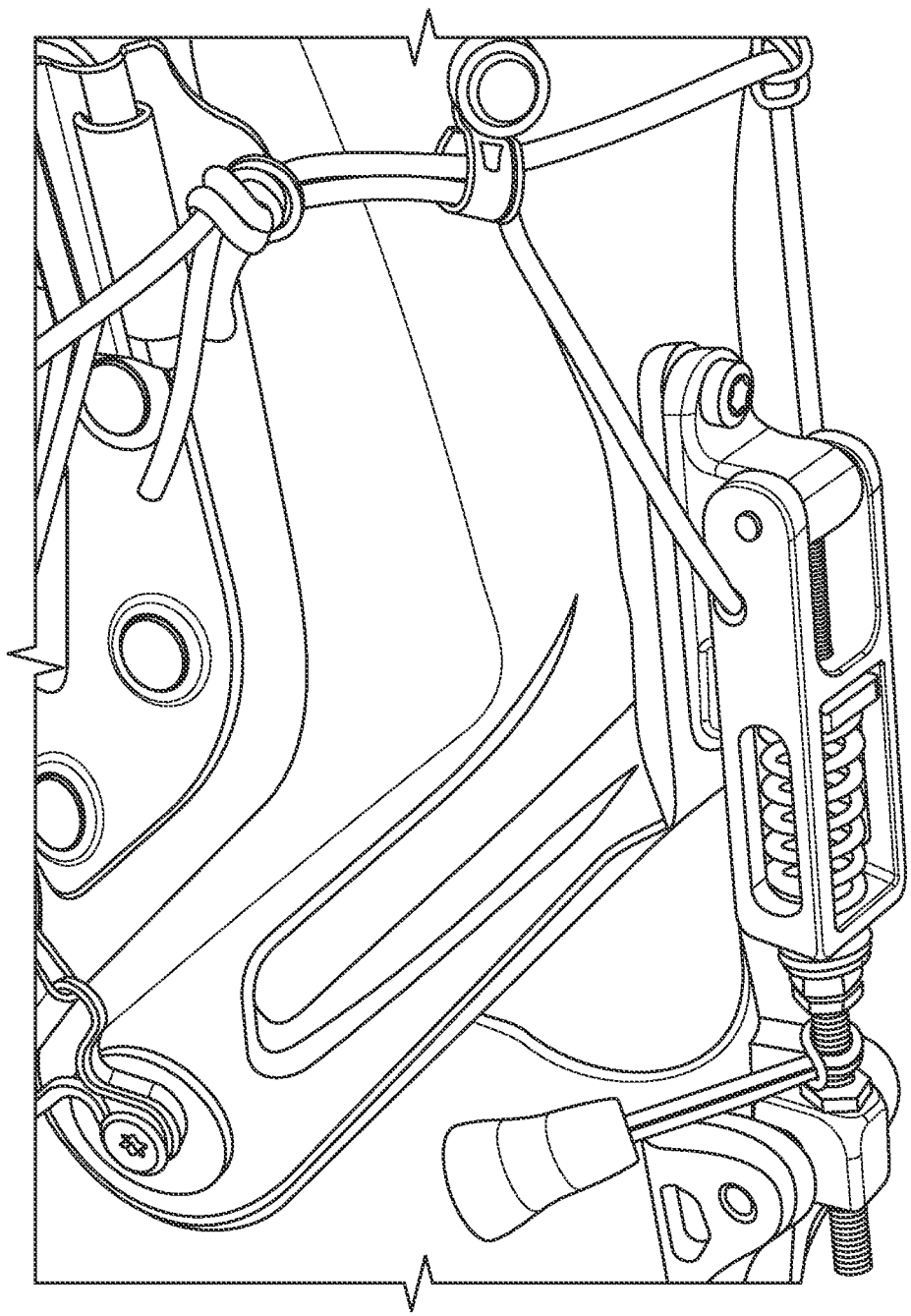
FIG. 4 is a close-up picture of the adjustable, dual-suspension lever of FIGS. 1-3 in the closed position with forward pressure forcing movement of the travel plate away from the hinged end of the lever body.

FIG. 1 is a picture of a boot comprising an upper part and a lower part connected by a pair of pivots and outfitted with an adjustable, dual-suspension lever; according to an embodiment of the invention. FIG. 2 is a picture of the adjustable, dual-suspension lever of FIG. 1 in the closed position. As shown, a lever bracket is attached to the heel-side of an upper part of a boot, and a lever body is attached to the bracket by a lever pivot axle. In some embodiments, a spring may be used to hold the lever in the closed position and/or in the open position (see, e.g., FIG. 11), The lever body optionally comprises one or more openings for receiving a cuff tensioning cable. In some embodiments, tension from the cuff tensioning cable and the location where the cable attaches to the lever causes the lever to be over-center locked. A forward-lean suspension system is disposed within the lever body, and a travel plate abutting an upper end of the forward-lean suspension device serves to contract the suspension device. As shown, the forward-lean suspension device comprises a spring within a lever body having a substantially open configuration. The spring surrounds a connector rod joining the travel plate and a connector head. In some embodiments, the spring is replaced by an alternate suspension system as described herein, and the lever body may be closed or partially closed to the external environment. For example, a closed or partially closed lever body may include embodiments with one or more solid walls, windows, or vented windows. A backward-lean suspension device comprising one or more foam washers is disposed outside the lever body, in the embodiment shown. The backward-lean suspension device may be secured by washers and/or a jam nut on the connector rod. In some embodiments, the one or more foam washers may be replaced by an alternate suspension system as described herein. A connector head near the unhinged end of the connector rod mates with a connector head interface device on the lower part of the boot, when the lever is in the closed position. In some embodiments (not shown), the connection between the connector head and the connector head interface device may comprise a machined feature in the slot of the connector head that snaps onto the interface device. As shown, the connector head is secured on the connector rod by a pair of jam nuts. An optional lever pull may be provided to facilitate opening and closing of the lever. FIG. 3 is a picture of the adjustable, dual-suspension lever of FIG. 1 and FIG. 2 in the open position. FIG. 4 is a close-up picture of the adjustable, dual-suspension lever of FIGS. 1-3 in the closed position with forward pressure forcing movement of the travel plate away from the hinged end of the lever body.

Figure 5:
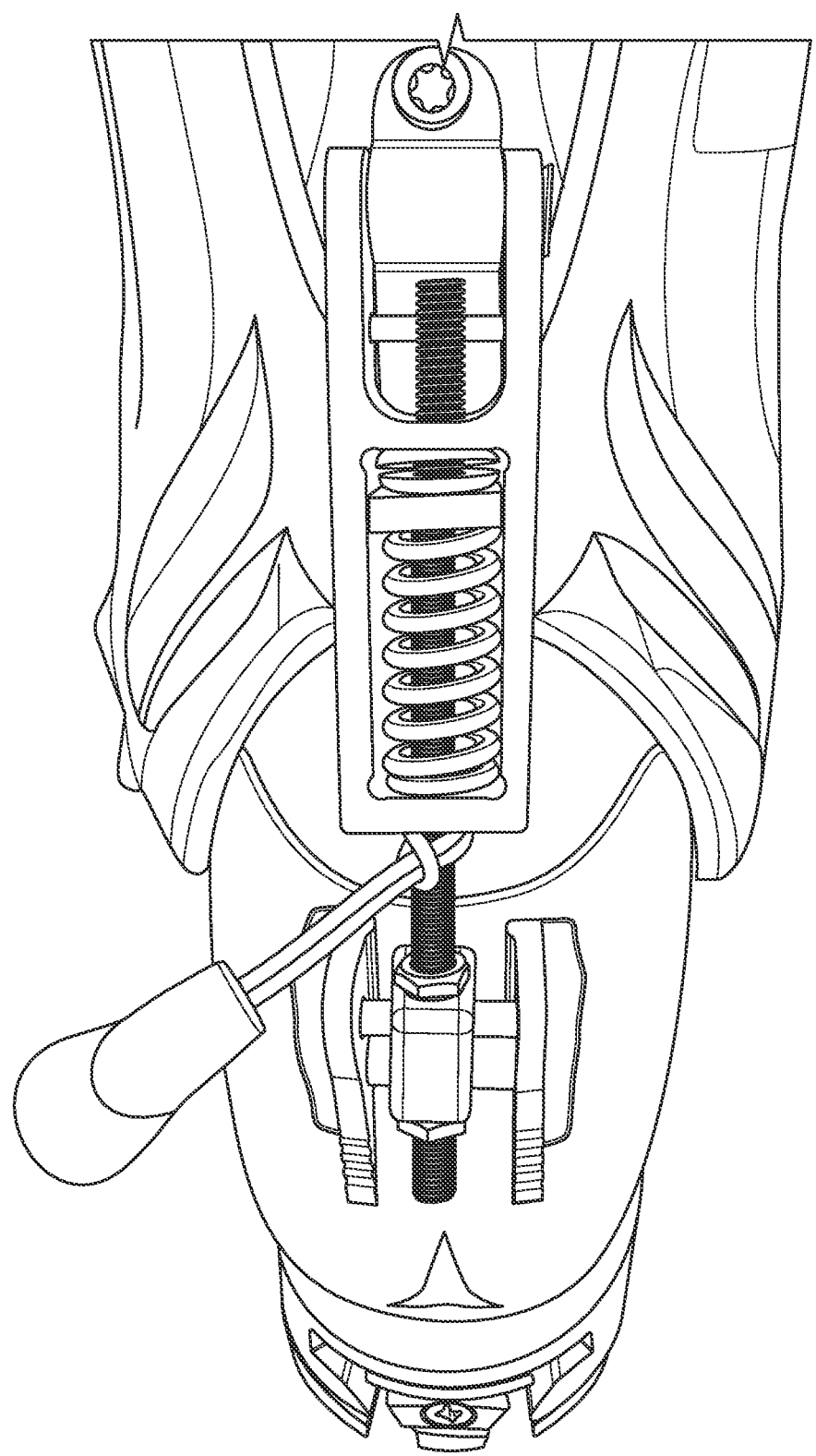
FIG. 5 is a close-up picture of an adjustable, dual-suspension lever with a backward-lean suspension device disposed inside a lever body, according to an embodiment of the invention.
Figure 6:
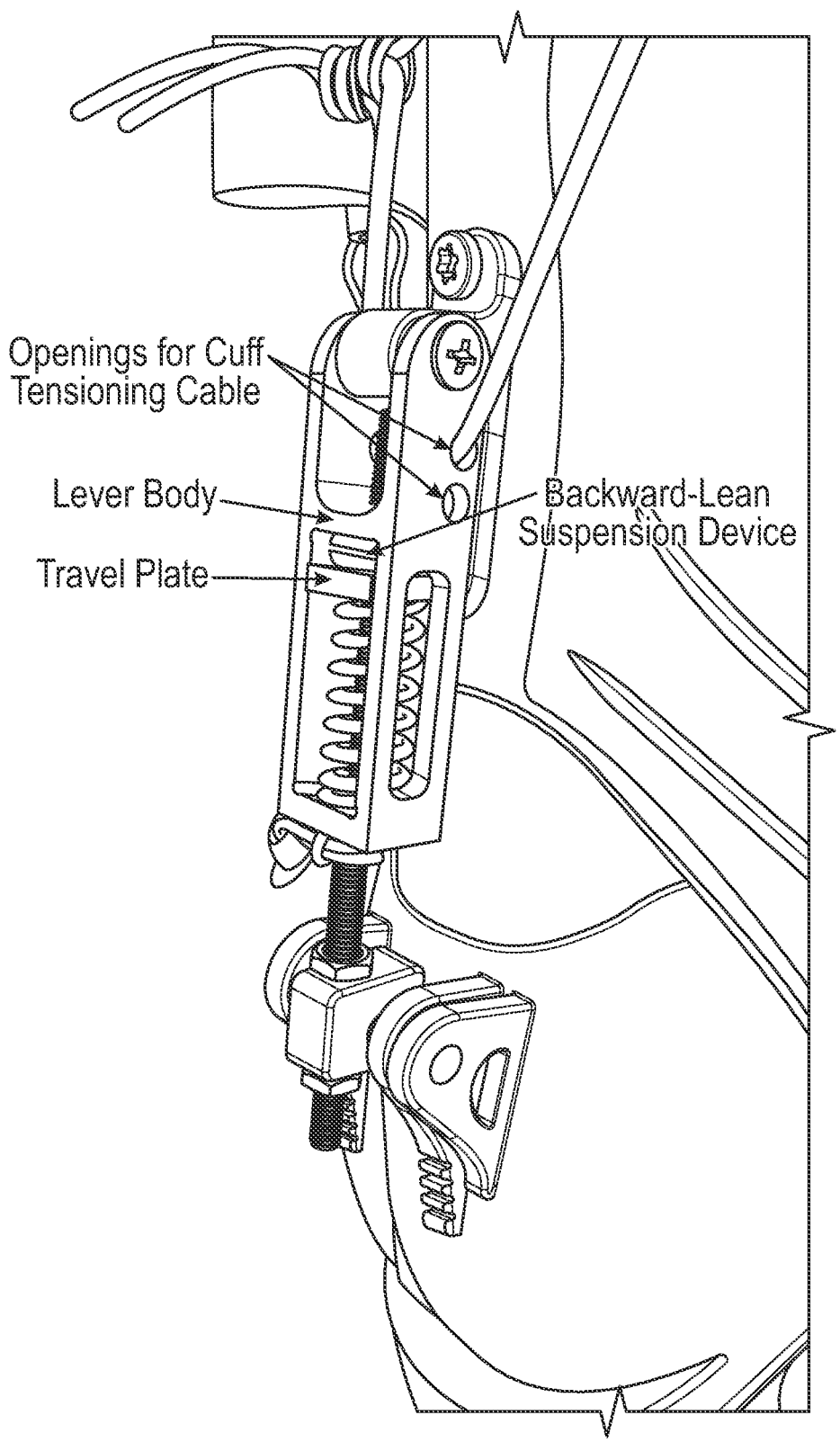
FIG. 6 is a picture of the adjustable, dual-suspension lever of FIG. 5 in the closed position.

FIG. 5 is a close-up picture of an adjustable, dual-suspension lever with a backward-lean suspension device disposed inside a lever body, according to an embodiment of the invention. As shown, the backward-lean suspension device is disposed between the travel plate and the hinged end of the lever body. FIG. 6 is a picture of the adjustable, dual-suspension lever of FIG. 5 in the closed position. As pictured, the lever body includes multiple openings for receiving a cuff tensioning cable, where use of the openings nearer the unhinged end of the lever provides greater tension on the cuff strap, when the lever is in the closed position.

Figure 7:
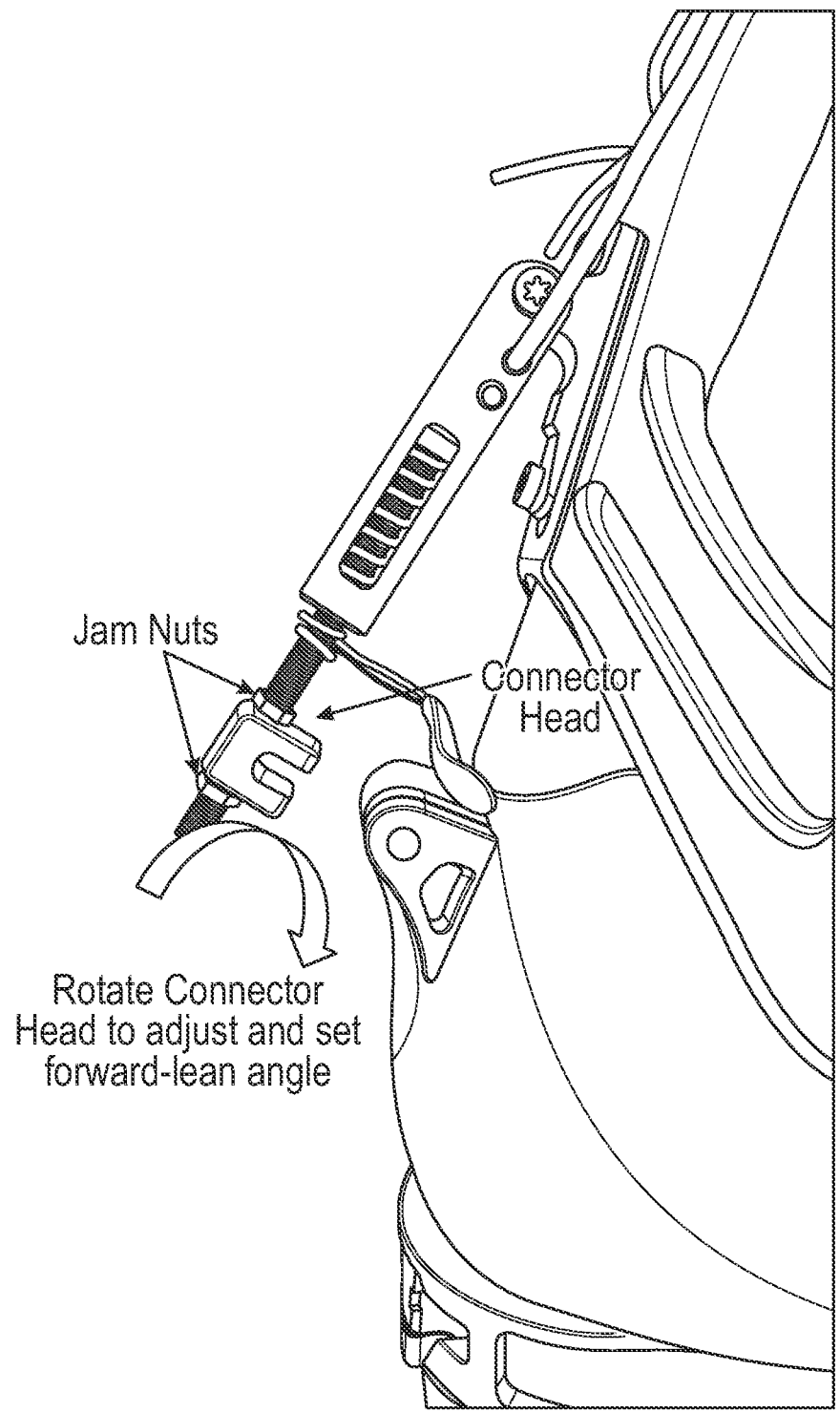
FIG. 7 is a picture of an adjustable, dual-suspension lever in the open position, illustrating a step for adjusting the forward-lean angle of the boot, according to an embodiment of the invention.

FIG. 7 is a picture of an adjustable, dual-suspension lever in the open position, illustrating a step for adjusting the forward-lean angle of the boot, according to an embodiment of the invention. Loosening the jam nuts that secure the connector head, moving the connector head closer to the hinged end of the lever, and retightening the jam nuts leads to a larger forward-lean angle and more upright stance, whereas loosening the jam nuts that secure the connector head, moving the connector head closer to the unhinged end of the lever, and retightening the jam nuts leads to a smaller forward-lean angle and more aggressive stance.

Figure 8:
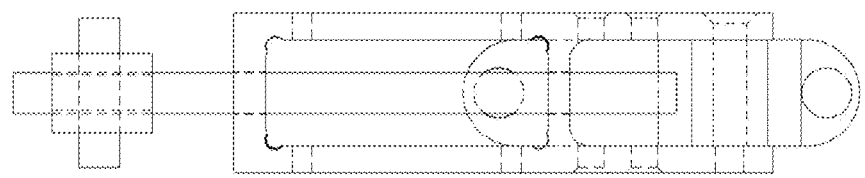
FIG. 8 provides top and side view mechanical drawings of an adjustable, dual-suspension lever, lever bracket, and connector head interface device, according to embodiments of the invention.
Figure 8:
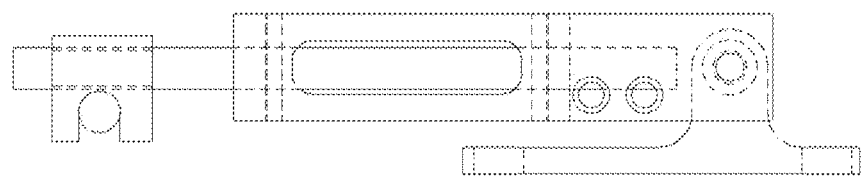

FIG. 8 illustrates top and side view mechanical drawings of an adjustable, dual-suspension lever, lever bracket, and connector head interface device, according to embodiments of the invention.

Figure 9:
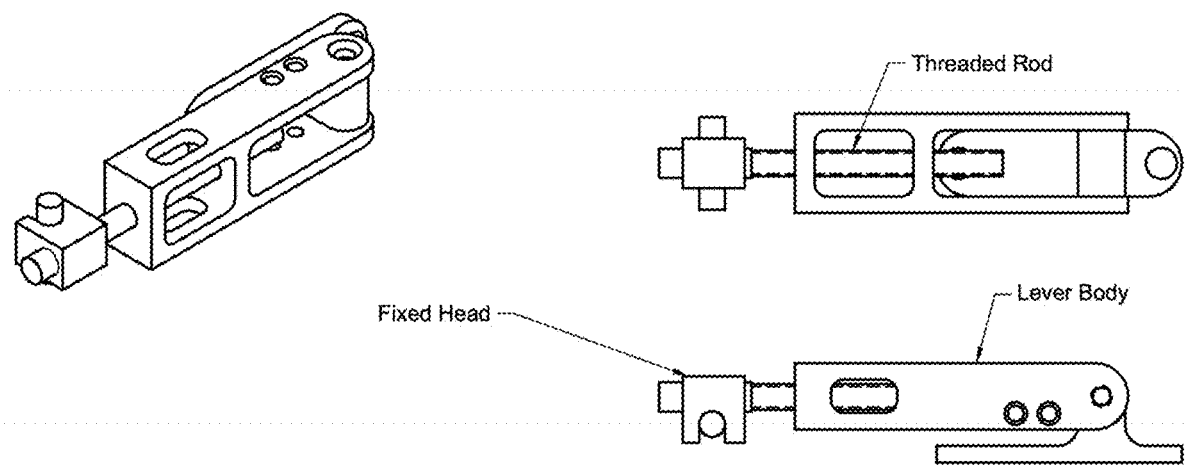
FIG. 9 provides mechanical drawings of an adjustable lever comprising a threaded connector rod with a fixed connector head, according to an embodiment.
Figure 10:
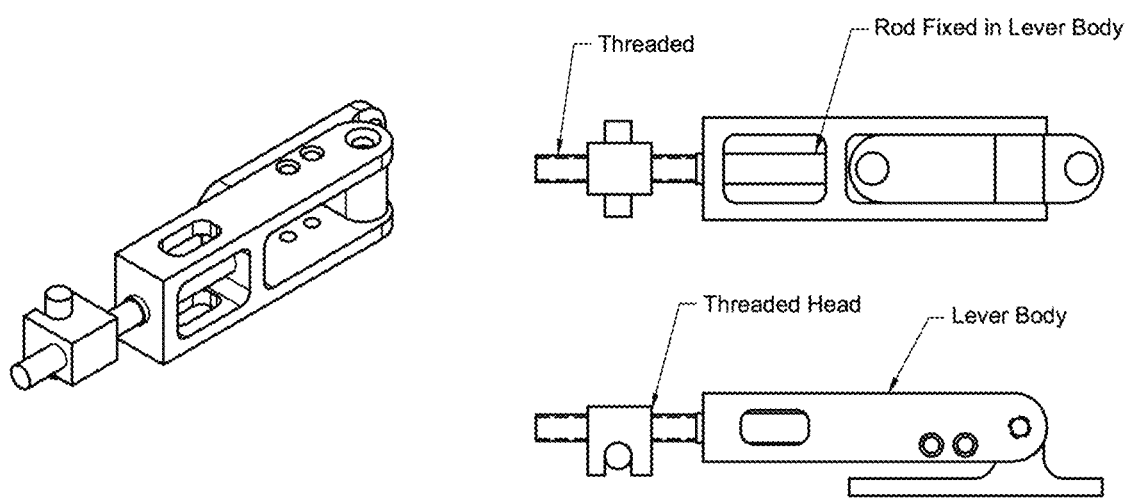
FIG. 10 provides mechanical drawings of an adjustable lever comprising a fixed connector rod and a translatable connector head, according to an embodiment.

FIG. 9 provides mechanical drawings of an adjustable lever comprising a threaded connector rod with a fixed connector head, according to an embodiment. FIG. 10 provides mechanical drawings of an adjustable lever comprising a fixed connector rod and a translatable connector head, according to an embodiment. In some embodiments, an adjustable lever may comprise a threaded connector rod and a translatable connector head, thereby provided adjustability at two positions. The levers of FIGS. 9 and 10 are shown without suspension, but forward-lean suspension devices and/or backward-lean suspension may optionally be added to the adjustable levers.

Figure 11:
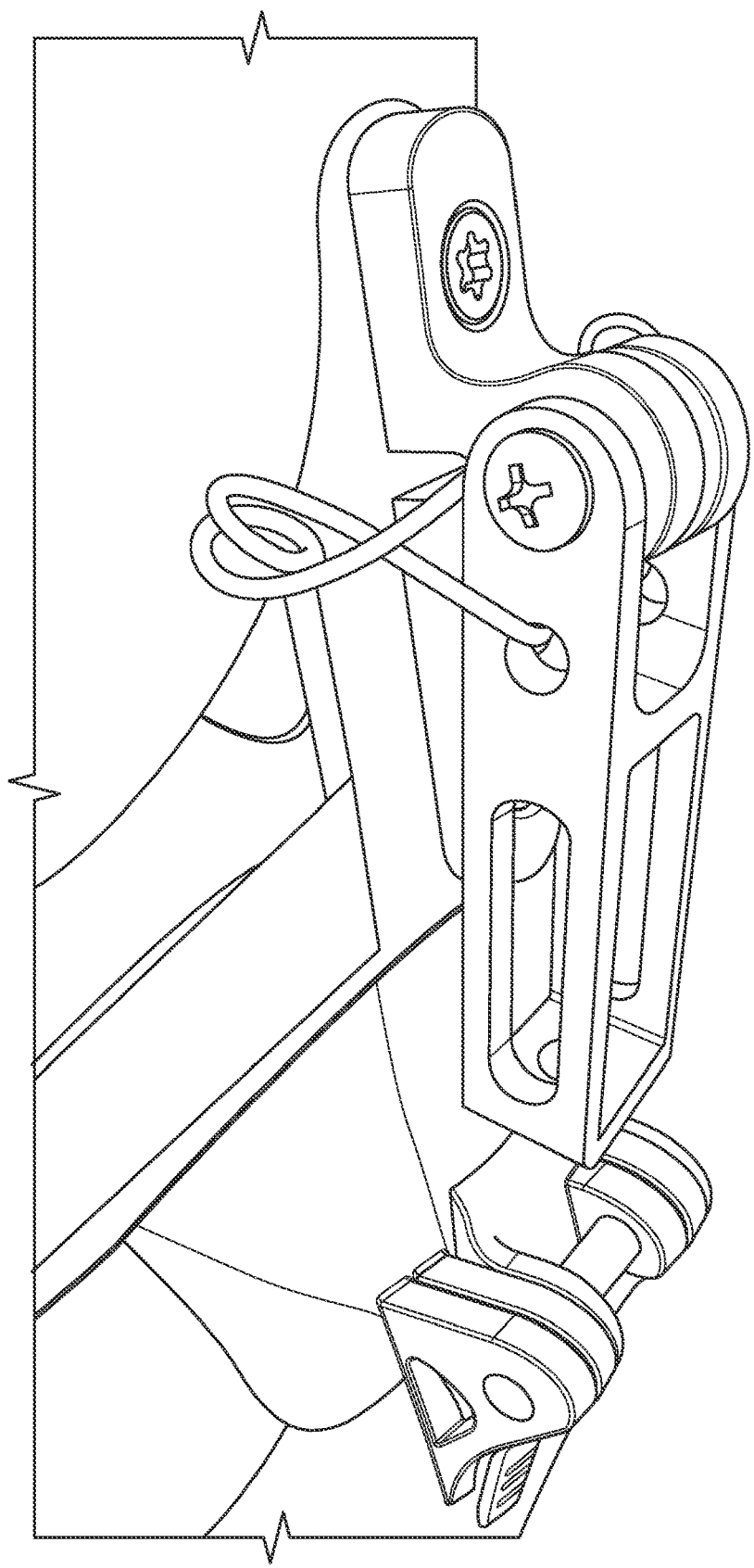
FIG. 11 is a picture of a lever body biased by a spring in a closed position against a lever bracket mounted on a boot, according to an embodiment.

FIG. 11 is a picture of a lever body biased by a spring in a closed position against a lever bracket mounted on a boot, according to an embodiment. Additionally or alternatively, the spring may tension the lever body in the open position.

Figure 12:
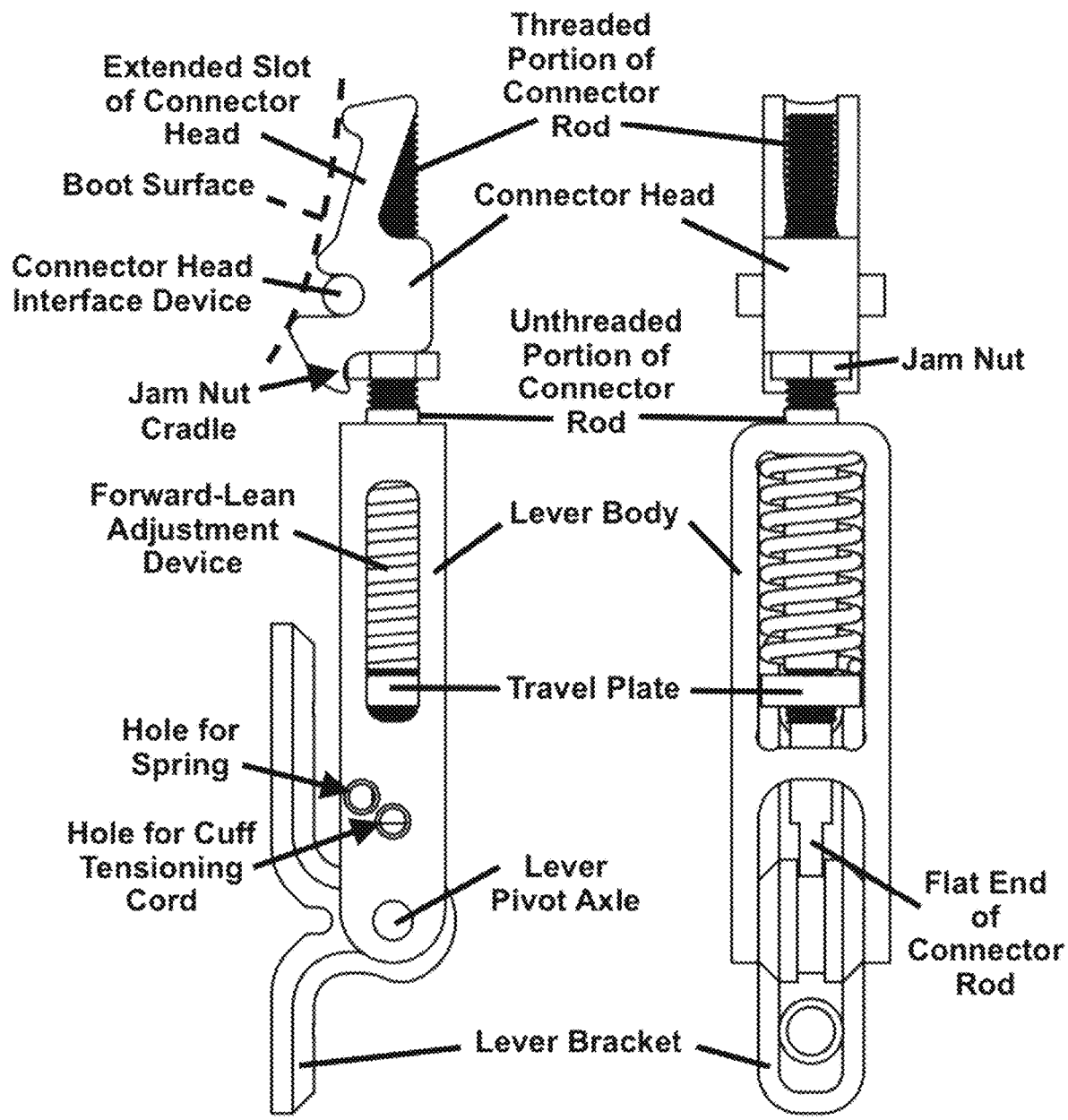
FIG. 12 provides mechanical drawings of an adjustable lever comprising a rotationally constrained connector rod, according to an embodiment.
Figure 13:
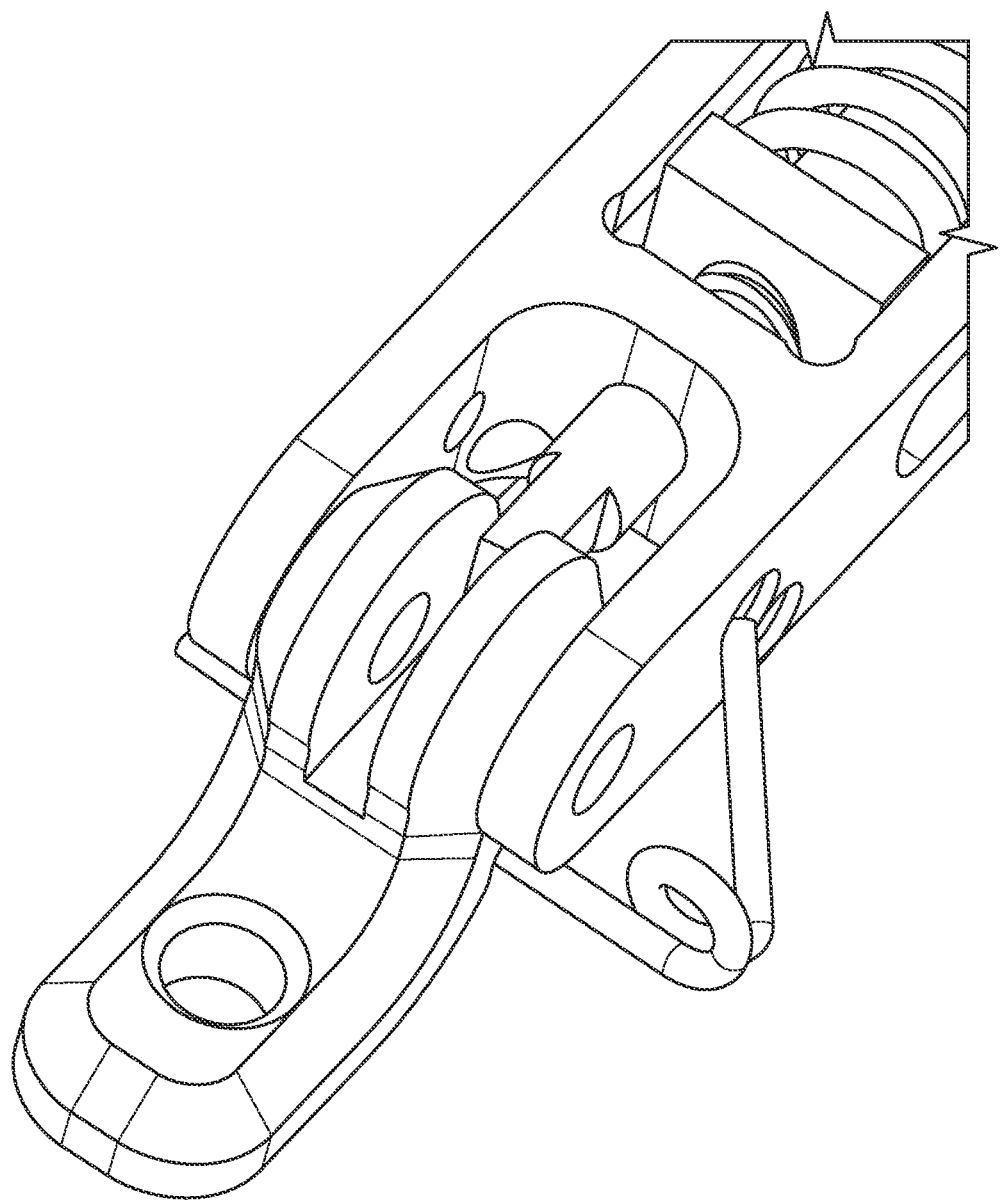
FIG. 13 shows a close-up schematic of the slotted lever bracket and mated connector rod of FIG. 12.

FIG. 12 provides mechanical drawings of an adjustable lever comprising a rotationally constrained connector rod, according to an embodiment. The connector rod comprises a flat end that mates with a slot of the lever bracket, thereby preventing rotation of the connector rod and any connector head that is locked onto the connector rod. This allows the lever to be opened and closed while maintaining alignment between the connector head and the connector head interface device, FIG. 13 shows a close-up schematic of the slotted lever bracket and mated connector rod. The flat end of the connector rod remains translatable within the slot of the lever body, which allows the suspension system(s) to operate as previously described.

In addition, as shown in FIG. 12, some portions of the connector rod may be unthreaded to facilitate assembly and movement of the forward-lean adjustment mechanism and/or backward-lean adjustment mechanism (not shown). The lever body may optionally comprise one or more holes for receiving a cuff-tensioning cord and/or a spring for biasing the lever body in an open/closed position, as shown in FIG. 11. When both spring and cord holes are present, the relative positions of the spring and cord holes may be the same as what is shown in FIG. 12 or reversed. A threaded connector head may be threaded onto a threaded portion of a connector rod, and a jam nut may be used to lock the position of the connector head. As shown, the connector head forms a jam nut cradle and an extended slot for receiving a portion of the connector rod. Portions of the connector head on either side of the connector head interface device and at a distal end of the extended slot may form contact points with a surface of a boot to increase structural integrity.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps. All art-known functional equivalents of materials and methods are intended to be included in this disclosure.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a boot" includes a plurality of such boots and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range and all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A boot comprising:
    a lower part for receiving at least a portion of a user's foot;
    an upper part for receiving at least a portion of the user's leg, wherein the upper part and the lower part are connected to one another by at least two pivot points; and
    a device that is adjustable between an open position that does not restrict rotation of the upper and lower parts and a closed position that restricts rotation of the upper and lower parts, the device comprising:
        a rod in slidable engagement with a housing, each of the rod and the housing connectable to a different one of the upper part and the lower part of the boot, the housing including a first compressible material surrounding the rod and an adjustable plate for applying a compressive force against the first compressible material; and
        a second compressible material surrounding the rod, wherein axial movement of the housing relative to the rod exerts opposite forces on the first and second compressible materials.

2. The boot of claim 1, wherein the second compressible material is disposed outside the housing.

3. The boot of claim 1, wherein the second compressible material is disposed inside the housing and is separated from the first compressible material by the plate.

4. The boot of claim 1, wherein the rod is threaded.

5. The boot of claim 1, further comprising a connector head that is translatable along a length of the rod.

6. The boot of claim 5, wherein the connector head is configured to mate with an interface on the lower part of the boot.

7. The boot of claim 1, wherein the first compressible material and/or the second compressible material is/are selected from the group consisting of a spring, a bumper of elastic material, an air shock, a hydraulic shock, or combinations thereof.

8. The boot of claim 1, wherein the housing comprises one or more openings for receiving a cable.

9. The boot of claim 1, further comprising a bracket hingedly mounted to the housing.

10. The boot of claim 9, wherein the bracket is mounted on the upper part of the boot.

11. The boot of claim 9, wherein the bracket comprises a slot for receiving an end of the connector rod.

* * * * *